United States Patent [19]
Wells

[11] Patent Number: 5,601,386
[45] Date of Patent: Feb. 11, 1997

[54] CUTTER BODY INCLUDING CUTTING FLUID GLAND

[75] Inventor: Wesley G. Wells, St. Louis, Mo.

[73] Assignee: McDonnell Douglas Corporation, St. Louis, Mo.

[21] Appl. No.: 375,407

[22] Filed: Jan. 18, 1995

[51] Int. Cl.$^6$ .................................................. B23B 51/06
[52] U.S. Cl. ............................. 408/57; 279/20; 408/59; 408/226; 409/136
[58] Field of Search ................................. 279/20, 99, 83; 408/57, 56, 59, 60, 226; 409/136, 234; 407/11

[56] References Cited

U.S. PATENT DOCUMENTS

| | | | |
|---|---|---|---|
| 1,979,325 | 11/1934 | Goldberg | 279/99 |
| 2,188,631 | 1/1940 | Kraus | 408/59 |
| 2,552,463 | 5/1951 | Searles | 408/56 |
| 4,392,761 | 7/1983 | Eckle | 279/20 |
| 4,530,625 | 7/1985 | Corley et al. | 408/14 |
| 4,563,116 | 1/1986 | Edens | 408/59 |
| 5,265,988 | 11/1993 | Schmigalla et al. | 408/239 R |
| 5,439,333 | 8/1995 | Kubo | 409/136 |

FOREIGN PATENT DOCUMENTS 2103123  2/1983  United Kingdom ..................... 408/59

Primary Examiner—Steven C. Bishop
Attorney, Agent, or Firm—Bell, Seltzer, Park & Gibson P.A.

[57] ABSTRACT

A cutter body includes an elongate, generally cylindrical chuck for gripping a cylindrical cutter, an annular cutting fluid gland surrounding the chuck, and retaining means for securing the gland longitudinally on the chuck. The cutter has a longitudinal bore therethrough defining a fluid passageway. The chuck has a longitudinal bore at least partially therethrough for gripping the cutter and defining a fluid passageway. The bore of the chuck is in fluid communication with the bore of the cutter. The chuck includes opposed ends and a medial portion disposed between the opposed ends. The medial portion includes longitudinally spaced-apart, circumferential lands which define bearing surfaces for engaging the inner surface of the cutting fluid gland. The medial portion has an opening therein defining a fluid passageway. The gland has an opening therein defining a fluid passageway. The opening of the gland is in fluid communication with the opening of the medial portion of the chuck, and the opening of the chuck is in fluid communication with the bore of the chuck. Accordingly, the opening of the gland, the opening of the medial portion of the chuck, the bore of the chuck and the bore of the cutter define a continuous fluid passageway for delivering the cutting fluid to the cutting portion of the cutter and the workpiece.

23 Claims, 2 Drawing Sheets

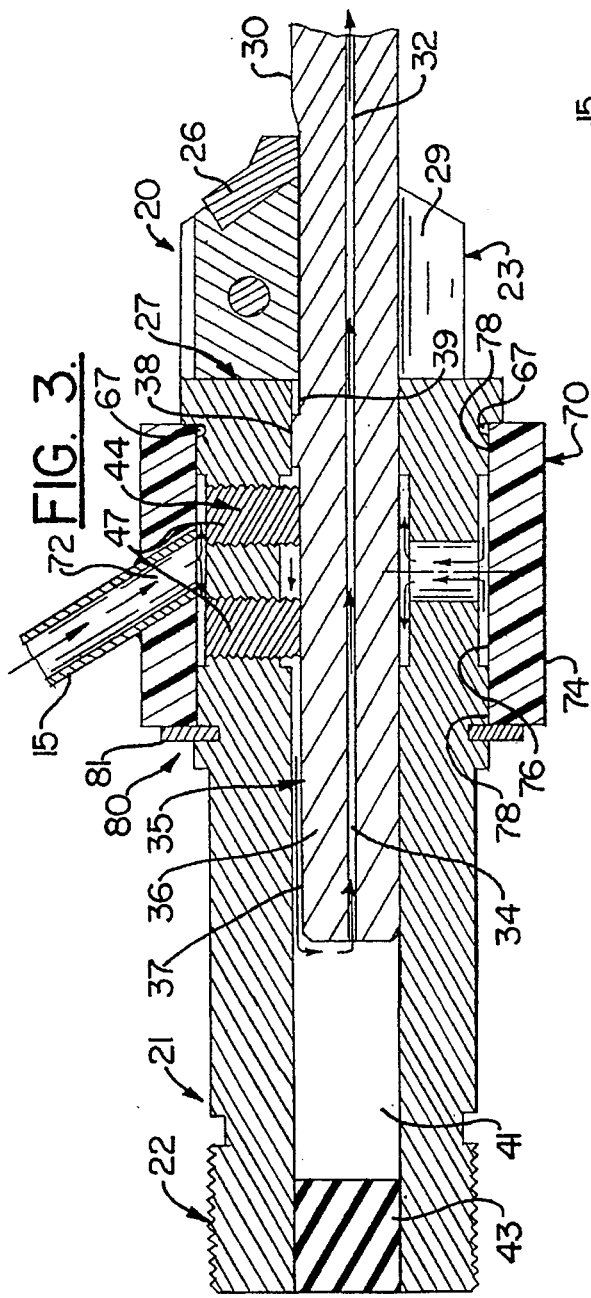

CUTTER BODY INCLUDING CUTTING FLUID GLAND

FIELD OF THE INVENTION

The present invention relates to a cutter body for a machining tool which includes a cutting fluid gland. More particularly, the invention relates to a cutter body which is adapted for delivering a lubricating and cooling fluid to the cutting portion of an oil hole drill and a workpiece.

BACKGROUND OF THE INVENTION

Cutting fluids, such as lubricants and coolants, are commonly used with machining tools, such as drilling machines, to facilitate the cutting operation. The cutting fluid is typically directed to the cutting portion of the tool and the material, or workpiece, being cut. In particular, the cutting fluid is typically directed to the cutting portion of the tool at the location, or worksite, where the cutter contacts the workpiece.

The cutting fluid acts as a coolant to keep the cutting portion of the cutter below the temperature at which its hardness and resistance to abrasion are reduced. The cutting fluid also keeps the workpiece cool to prevent it from warping during the cutting operation. Maintaining the cutting portion of the cutter below the critical temperature and preventing the workpiece from warping produces a clean cut and more accurate final dimensions on the workpiece.

The cutting fluid also acts as a lubricant to reduce the power consumption of the cutter, reduce wear on the cutting portion, and reduce the amount of heat generated by the cutting operation. Lubrication can also provide an improved finish on the workpiece, flush composite dust and metal chips created during the cutting operation from the worksite, and prevent corrosion of the workpiece and the cutter.

The cutting fluid may be supplied to the cutting portion of the cutter and the workpiece externally or internally. In a drilling machine, a conventional means for delivering the cutting fluid to the cutting portion of the cutter and the workpiece internally is an oil hole drill. The oil hole drill has a longitudinal bore therethrough which defines a fluid passageway for the cutting fluid. Cutting fluid from an external supply source is delivered to the cutting portion of the cutter and the workpiece through the passageway defined by the bore of the oil hole drill.

Typically, a chuck secures the oil hole drill to the rotating element, or spindle, of the drilling machine. In a conventional drilling machine adapted for use with an oil hole drill, the chuck has a radially extending opening therethrough which defines a fluid passageway for the cutting fluid. The opening is in fluid communication with the bore of the oil hole drill so that the opening of the chuck and the bore define a continuous fluid passageway for delivering the cutting fluid to the cutting portion of the cutter and the workpiece.

The opening of the chuck is surrounded by an annular sleeve, known in the art as a cutting fluid gland, which prevents leakage of the cutting fluid from the machinery joint between the chuck and the cutting fluid gland. The chuck is rotatable relative to the cutting fluid gland such that the spindle of the drilling machine rotates the chuck and the oil hole drill to accomplish the cutting operation.

The cutting fluid gland has a radially extending opening therethrough which defines a fluid passageway for the cutting fluid. The opening is in fluid communication with the opening of the chuck so that the opening of the cutting fluid gland, the opening of the chuck, and the bore of the oil hole drill define a continuous fluid passageway for delivering the cutting fluid to the cutting portion of the cutter and the workpiece.

Conventional drilling machines which include an oil hole drill typically use spaced-apart, rubberized O-rings to seal the circumferential joint between the chuck and the cutting fluid gland. A portion of the cutting fluid lubricates the O-rings and reduces the rotational friction between the chuck and the gland. The drilling machine, however, can operate at rotational speeds exceeding about 10,000 revolutions per minute (RPM). The O-rings can thus deteriorate rapidly in the high-temperature environment of the machinery joint.

Consequently, the rubberized O-rings can fail abruptly and without warning. Failure of the O-rings results in a rapid and complete loss of the cutting fluid to the cutting portion of the cutter and the workpiece. Although they are relatively inexpensive, replacement of the O-rings requires that the drilling machine be shut-down. The suspension of the cutting operation for a period of time results in a significant loss of production, particularly when the failure of the O-rings cannot be anticipated.

It is therefore an object of the invention to provide a cutter body for a machining tool which is adapted for reliably delivering a cooling and lubricating fluid to the cutting portion of the tool and a workpiece.

It is a more particular object of the invention to provide a cutter body for a drilling machine which includes a chuck and a cutting fluid gland, and which does not use conventional O-rings to seal the machinery joint between the chuck and the gland.

It is another object of the invention to provide a cutter body for a machining tool which includes a cutting fluid gland having bearing surfaces made of a self-lubricating and self-sealing material.

It is another object of the invention to provide a cutter body for a machining tool including an oil hole drill having a longitudinal bore therethrough which defines a fluid passageway for delivering a cutting fluid to the cutting portion of the tool and a workpiece.

It is another object of the invention to provide a cutter body for a machining tool including a chuck having an opening therethrough which defines a fluid passageway for delivering a cutting fluid to the cutting portion of the tool and a workpiece.

It is another object of the invention to provide a cutter body for a machining tool including a cutting fluid gland having an opening therethrough which defines a fluid passageway for delivering a cutting fluid to the cutting portion of the tool and a workpiece.

It is another object of the invention to provide a cutter body for a machining tool including a cutting fluid gland which is in fluid communication with a chuck which is in fluid communication with an oil hole drill for delivering a cutting fluid to the cutting portion of the tool and a workpiece.

SUMMARY OF THE INVENTION

The above and other objects and advantages of the invention are achieved in the embodiments described herein by the provision of a cutter body for a machining tool adapted for delivering a cutting fluid to the cutting portion of the tool and a workpiece at the location where the cutter contacts the workpiece. The cutter body includes a cutting fluid gland and a chuck for securing an oil hole drill to the rotatable spindle of the machining tool.

The cutter is an oil hole drill which includes a cutting portion and an elongate, generally cylindrical shank having a longitudinal bore therethrough. The bore of the oil hole drill defines a fluid passageway for delivering the cutting fluid from an external source to the worksite where the cutting portion of the cutter contacts the workpiece. The cutting portion may be a drill bit, a countersink bit, a counterbore bit, a back counterbore bit, a reamer or any other cutting tool for machining a workpiece.

The cutting portion may be integral with the oil hole drill, or may be attached, such as by clamping, welding or brazing, to one end of the shank. Flats are machined on the upper surface of the opposite end of the shank which receive gripping means for securing the oil hole drill in the chuck of the cutter body. The shank of the oil hole drill is gripped by the chuck of the cutter body such that when the spindle of the machining tool rotates the cutter body, the cutting portion of the cutter machines the workpiece.

The cutter body of the invention includes a chuck for gripping the oil hole drill, an annular cutting fluid gland surrounding the chuck, and retaining means for securing the gland on the chuck. The chuck is generally cylindrical and has opposed ends, a medial portion between the opposed ends, and a longitudinal bore at least partially therethrough for receiving the oil hole drill. The chuck includes means for securely gripping the shank of the oil hole drill within the bore of the chuck. A pocket is provided adjacent the forward end of the chuck for locating an optional countersink blade.

Preferably, the medial portion of the chuck includes a radial opening which extends from the outer surface of the medial portion inward to the bore of the chuck. The opening of the medial portion of the chuck is in fluid communication with the bore of the oil hole drill such that the opening of the chuck and the bore of the oil hole drill define a continuous fluid passageway for delivering the cutting fluid to the cutting portion of the cutter and the workpiece.

The medial portion of the chuck includes a reduced diameter portion on the outer surface of the chuck, and an increased diameter portion adjacent the bore of the chuck. The reduced diameter portion on the outer surface and the increased diameter portion adjacent the bore define circumferential fluid passageways for delivering the cutting fluid to the cutting portion of the cutter and the workpiece.

The reduced diameter portion on the outer surface is in fluid communication with the opening of the chuck. The increased diameter portion adjacent the bore is in fluid communication with the opening of the chuck and the bore of the oil hole drill. Thus, the reduced diameter portion on the outer surface of the medial portion of the chuck, the opening of the chuck, the increased diameter portion adjacent the bore of the chuck, and the bore of the oil hole drill define a continuous fluid passageway for delivering the cutting fluid to the cutting portion of the cutter and the workpiece.

The medial portion further includes a pair of longitudinally spaced-apart lands which extend forward and rearward from the reduced diameter portion on the outer surface of the chuck towards the opposed ends. The lands define bearing surfaces for engaging the inner surface of the annular cutting fluid gland.

The chuck further includes a raised diameter portion adjacent one end of the medial portion of the chuck. The raised diameter portion defines a shoulder with one of the lands, or bearing surfaces, of the medial portion. Adjacent the opposite end of the medial portion, the chuck has a circumferential groove formed therein for receiving retaining means for securing the cutting fluid gland on the chuck. The retaining means secure the gland longitudinally on the medial portion of the chuck.

The cutting fluid gland of the cutter body is an elongate, annular cylinder which is positioned to surround the medial portion of the chuck. The gland includes circumferential, self-lubricating and selfsealing bearing material at each end on the inner surface for engaging the lands of the medial portion of the chuck. The bearing material lubricates and seals the machinery joint between the chuck and the gland such that the chuck (and the oil hole drill secured to the chuck) rotate freely relative to the cutting fluid gland.

The cutting fluid gland further includes an opening which extends through the wall of the gland from the outer surface inward to the inner surface. Adjacent the outer surface of the gland, the opening is adapted to receive a supply tube from an external source of cutting fluid. Adjacent the inner surface of the gland, the opening is in fluid communication with the reduced diameter portion on the outer surface of the medial portion of the chuck. Thus, the opening of the gland, the reduced diameter portion on the outer surface of the medial portion of the chuck, the opening of the chuck, the increased diameter portion adjacent the bore of the chuck, and the bore of the oil hole drill define a continuous fluid passageway for delivering the cutting fluid to the cutting portion of the cutter and the workpiece.

In a preferred embodiment, the cutter body is used in conjunction with a hydraulic depth sensing device to control the depth of fastener holes and countersinks in contoured surfaces, such as composite aircraft wings, where the flushness of the fastener head is critical. An oil hole drill having a longitudinal bore therethrough is received and secured in the longitudinal bore of the chuck of the cutter body by gripping means. The annular cutting fluid gland is then positioned around the chuck of the cutter body against the raised diameter portion adjacent one end of the medial portion of the chuck. Retaining means are positioned in the circumferential groove of the chuck at the other end of the medial portion to secure the cutting fluid gland longitudinally relative to the chuck.

A countersink blade is positioned and secured in the locating pocket provided adjacent the forward end of the cutter body immediately behind the cutting portion of the oil hole drill. The cutter body (including the oil hole drill and the countersink blade) is then threaded onto the spindle of the machining tool. The cutter body is positioned on the hydraulic depth sensor so that the cutting portion of the oil hole drill and the countersink blade will machine the workpiece to a predetermined depth.

A flexible supply tube from the fluid pump of an external source of lubricating coolant is attached to a quick-release connection. A rigid copper tube extends from the quick-release connection and is fixed to the opening of the cutting fluid gland such that cutting fluid may be delivered to the cutting portion of the cutter and the workpiece. Continuously, or on demand, cutting fluid is pumped from the external source to the opening of the cutting fluid gland. The head pressure in the opening of the cutting fluid gland forces the cutting fluid to flow circumferentially around the reduced diameter portion on the outer surface of the medial portion of the chuck to the opening of the chuck.

The cutting fluid flows through the opening of the chuck, and is then forced circumferentially around the increased diameter portion adjacent the bore of the chuck until the cutting fluid reaches the upper surface of the shank of the oil hole drill. The cutting fluid then flows rearward along the flats on the shank of the oil hole drill to a cavity in the bore of the chuck adjacent the rear of the oil hole drill. The head pressure then forces the cutting fluid through the bore of the oil hole drill such that cutting fluid is delivered to the cutting portion of the cutter and the workpiece.

BRIEF DESCRIPTION OF THE DRAWINGS

Some of the objects and advantages of the invention having been stated, others will appear as the description proceeds when considered in conjunction with the accompanying drawings in which like numerals denote the same items in the different views, and in which:

FIG. 3 is a longitudinal section view taken along line 3—3 of FIG. 2;

FIG. 4 is a longitudinal section view of the chuck of the cutter body of FIG. 1; and FIG. 5 is transverse section view taken along line 5—5 of FIG. 2.

DETAILED DESCRIPTION OF THE PREFERRED EMBODIMENTS

Figure 1:
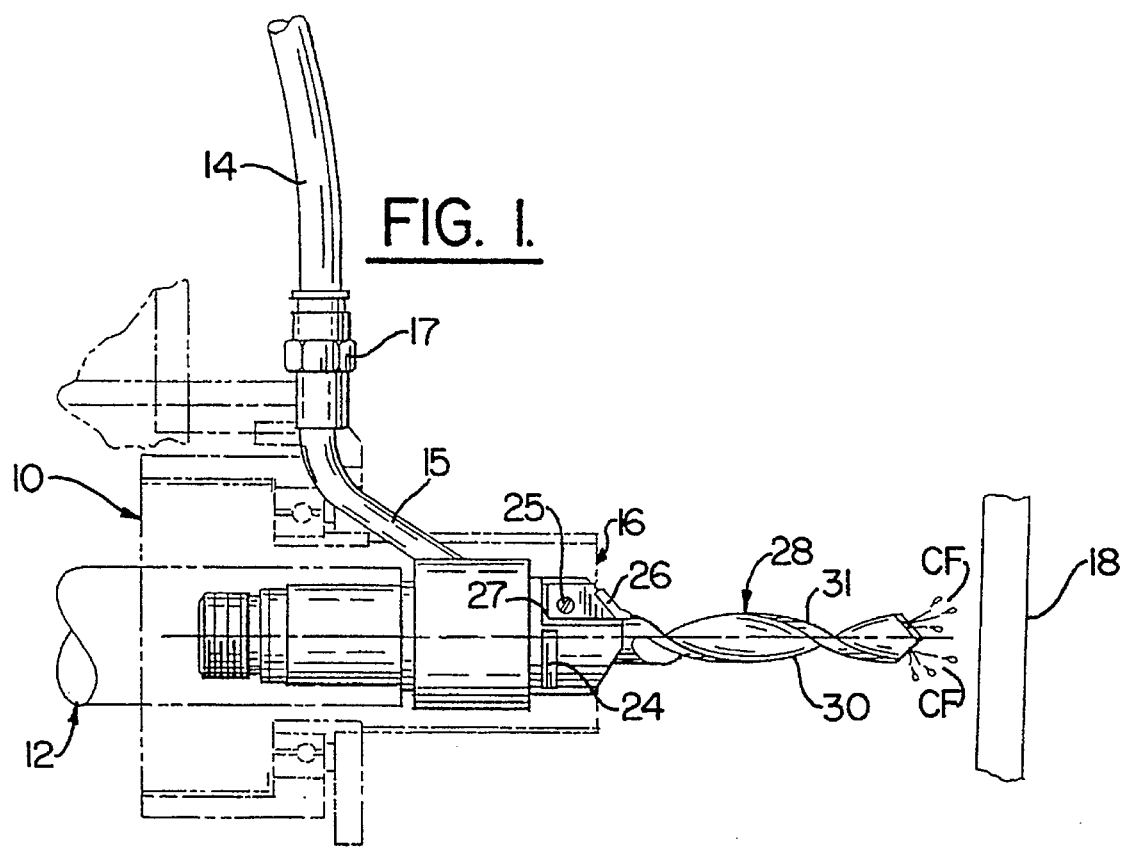
FIG. 1 illustrates a cutter body according to the invention and a machining tool adapted for delivering a lubricating and cooling fluid to the cutting portion of the tool and a workpiece.
Figure 2:
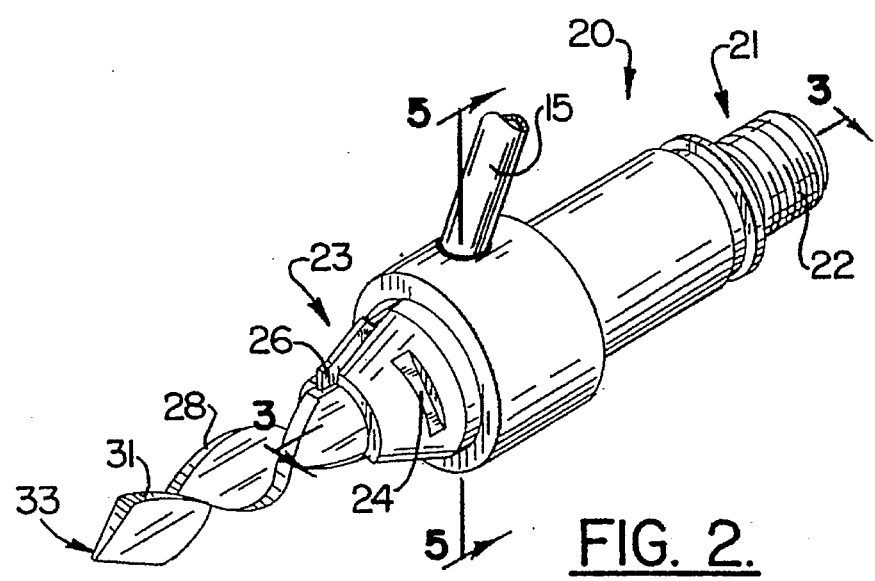
FIG. 2 is a perspective view of an oil hole drill and an optional countersink blade secured to the cutter body of FIG. 1.

Referring more particularly to the drawings, FIG. 1 illustrates a machining tool and a cutter body, indicated generally at 20, according to the invention. The machining tool is preferably a hydraulic depth sensor 10 which is used in conjunction with an Assembly Drilling System to drill and countersink fastener holes in, for example, an aircraft wing. The cutter body 20 is secured to the hydraulic depth sensor 10 and is adapted for delivering a lubricating and cooling fluid, referred to in the art as a cutting fluid, CF to the cutting portion 28 of the tool and a workpiece 18.

The cutter body 20 comprises an externally threaded portion 22 at the rear end 21 for threadably engaging a threaded recess in a rotatable spindle 12 of the hydraulic depth sensor 10. The cutter body 20 is threadably received in the spindle 12 and tightened using wrenching flats 24 located adjacent the forward end 23 of the cutter body. Thus, when the spindle motor (not shown) rotates the spindle 12, the cutting portion 28 of the tool machines the workpiece 18. The cutting fluid CF is supplied, continuously, or on demand, to the cutter body 20 through a flexible supply tube 14 from an external source (not shown) of coolant to facilitate the cutting operation. The flexible tube 14 is attached to a quick-release connection 17. The connection 17 includes a rigid copper tube 15 extending therefrom and fixed, such as by brazing, to the cutter body 20.

An optional countersink blade 26 may be positioned and secured in locating pocket 27 adjacent the forward end 23 of cutter body 20 with screw 25. The hydraulic depth sensor 10 further comprises a nosepiece 16. The location of the nosepiece 16 is set such that the cutting portion 28 of the tool machines the workpiece 18 to a predetermined depth, and the countersink blade 26 machines a countersink in the workpiece to a predetermined depth and diameter. The depth of the fastener hole, and the depth and diameter of the countersink is controlled because it is desirable for fasteners received in the fastener holes to be flush with the outer surface of the aircraft wing.

In a preferred embodiment, illustrated in FIGS. 2–5, the cutter body 20 comprises a chuck 40 for gripping the cutter, an annular cutting fluid gland 70 surrounding the chuck, and retaining means 80 for longitudinally securing the cutting fluid gland on the chuck. The cutter may be any tool which is commonly used for performing a drilling, tapping, boring, counterboring, reaming, threading, milling, grinding or broaching operation on a workpiece. In the illustrated embodiment, the cutter is an oil hole drill 30.

Typically, the oil hole drill 30 is made of carbon steel or high-speed steel with trace additions of vanadium and chromium, and small additions of cobalt or molybdenum, respectively, for hardness. Depending on the hardness of the workpiece 18 to be cut, the oil hole drill 30 may be made of another material, such as Stellite, Crobalt, Deloro Nos. 40 and 80, or even diamond. Because of the high cost of these materials, the shank 36 of the oil hole drill 30 may be made of a lower grade steel and the cutting portion 28 brazed or clamped to the shank.

Oil hole drill 30 is generally cylindrical and has a longitudinal bore 32 (FIG. 3) therethrough which defines a fluid passageway 34 (FIG. 5) for delivering the cutting fluid CF to the cutting portion 28 and the workpiece 18. Thus, cutting fluid CF delivered to the bore 32 of the oil hole drill 30 (as will be described in greater detail hereafter) passes through the fluid passageway 34 in the direction of the cutting portion 28 and the workpiece 18 as indicated by the arrows in FIG. 3.

A rear flat 37 and a forward flat 39 are machined on the upper surface 35 of the shank 36 of the oil hole drill 30. Forward flat 39 provides a mounting surface for supporting the optional countersink blade 26. Rear flat 37 is separated from forward flat 39 by a cylindrical land 38 of material which remains on the oil hole drill 30 after the flats are machined. Cylindrical land 38 has a relatively tight slip-fit with chuck 40 of the cutter body 20 so that a seal is formed between the cylindrical land and the chuck. Cutting fluid CF delivered to the upper surface 35 of the shank 36 (as will be described in greater detail hereafter) is forced rearward along rear flat 37 into bore 32 as indicated by the arrows in FIG. 3. Thus, rear flat 37 is in fluid communication with bore 32 of oil hole drill 30 for delivering cutting fluid CF to the cutting portion 28 and the workpiece The oil hole drill 30 preferably comprises a helical flute 31 which forms the cutting portion 28 of the machining tool. The flute 31 is conventionally shaped to optimize the performance of the machining tool. The longitudinal bore 32 of the oil hole drill 30 exits the cutting portion 28 through a pair of diametrically opposed openings (not shown) located on the walls of the flute 31 at the cutting end 33. In a preferred embodiment, forward flat 39 meets the flute 31 adjacent the forward end 23 in a "flat-to-flute" transition which permits composite dust and/or metal chips flushed from the worksite by the cutting fluid to exit out chip release passageway 29 (FIG. 3) along the length of the cutter body 20 in the direction of rear end 21.

The chuck 40 of the cutter body 20 is generally cylindrical and has a longitudinal bore 42 at least partially therethrough for receiving the shank 36 of the oil hole drill 30. The chuck 40 comprises gripping means 44 for gripping shank 36 of the oil hole drill 30 opposite the cutting portion 28. Gripping means 44 engage rear flat 37 adjacent cylindrical land 38 such that when the oil hole drill 30 is secured within bore 42 of chuck 40, a cavity 41 is formed behind the oil hole drill adjacent the rear end 21 of the cutter body 20. A soft plug 43 prevents the cutting fluid CF which is forced into cavity 41 from escaping out the rear end 21 of the cutter body 20. The volume of cutting fluid CF trapped in cavity 41 creates a head pressure which forces the cutting fluid through bore 32 of oil hole drill 30 to the cutting portion 28 and the workpiece 18.

In a preferred embodiment (FIG. 4), gripping means 44 comprise a pair of threaded holes 45 and a pair of set screws 47. Holes 45 extend radially inward from the outer surface 46 of chuck 40 to the inner surface 48 of bore 42. Set screws 47 threadably engage holes 45 and are tightened against rear flat 37 on shank 36 to secure the oil hole drill 30 within bore 42 of chuck 40. The force of the set screws 47 against the upper surface 35 of the oil hole drill 30 presses the remaining cylindrical portion of shank 36 tightly against the inner surface 48 of bore 42. Thus, a seal is formed between the shank 36 of the oil hole drill 30 and the bore 42 of chuck 40 such that the cutting fluid CF is prevented from flowing along the shank except along rear flat 37 in the direction of cavity 41.

The chuck 40 comprises a medial portion 50 (FIG. 4) disposed between rear end 21 and forward end 23 of the cutter body 20. The medial portion B0 comprises a radial opening 52 therethrough opposite gripping means 44 which extends from the outer surface 46 of chuck 40 inward to the inner surface 48 of bore 42. The medial portion 50 comprises a circumferential, increased diameter portion 54 on the inner surface 48 of bore 42. Opening 52 defines a fluid passageway 53 (FIG. 5) which is in fluid communication with the increased diameter portion 54 of medial portion 50. Increased diameter portion 54 defines a fluid passageway 55 (FIG. 5) which is in fluid communication with rear flat 37 on shank 36 of oil hole drill 30. Accordingly, opening 52 of chuck 40, increased diameter portion 54, rear flat 37, cavity 41 and bore 32 of oil hole drill 30 define a continuous fluid passageway for delivering the cutting fluid CF to the cutting portion 28 and the workpiece 18.

The medial portion 50 of chuck 40 comprises a circumferential, reduced diameter portion 56 on the outer surface 46 of chuck 40. The reduced diameter portion 56 defines a fluid passageway 57 (FIG. 5) which is in fluid communication with opening 52. Accordingly, reduced diameter portion 56, opening 52, increased diameter portion 54, rear flat 37, cavity 41 and bore 32 of oil hole drill 30 define a continuous fluid passageway for delivering the cutting fluid CF to the cutting portion 28 and the workpiece 18.

The medial portion 50 of chuck 40 further comprises circumferential forward land 58, longitudinally spaced-apart from circumferential rear land 60. Land 58 and land 60 extend from reduced diameter portion 56 on the outer surface 46 of chuck 40 in the direction of forward end 23 and rear end 21 of cutter body 20, respectively. Lands 58, 60 define bearing surfaces 62 for engaging the annular cutting fluid gland 70. The chuck 40 comprises a raised diameter portion 64 adjacent first end 63 of medial portion 50. Raised diameter portion 64 is separated from adjacent land 58 of medial portion 50 by a relief cut 67 to define a shoulder 66 on chuck 40. Adjacent second end 65 of medial portion 50, chuck 40 has a circumferential groove 68 formed therein for receiving retaining means 80 therein to secure the cutting fluid gland 70 on the chuck. In a preferred embodiment (FIG. 3), retaining means 80 comprises a conventional snap ring 81 which secures the cutting fluid gland 70 longitudinally on the medial portion 50 against shoulder 66 of chuck 40.

The cutting fluid gland 70 of the cutter body 20 is generally annular and preferably surrounds the medial portion 50 of chuck 40. Cutting fluid gland 70 is preferably made of cast bronze, but may be made of any suitable non-corrosive metal or high-strength plastic which may be formed into the desired annular shape. The cutting fluid gland 70 has an opening 72 therethrough which extends from the outer surface 74 inward to the inner surface 76 of the cutting fluid gland. Opening 72 may extend radially through cutting fluid gland 70, but preferably is angled rearward in the direction of rear end 21 of cutter body 20.

At least a portion of the inner surface 76 of the cutting fluid gland 70 comprises bearing surfaces 78 which engage bearing surfaces 62 on medial portion 50 of chuck 40. Bearing surfaces 78 are made of a self-lubricating bearing material which lubricates and seals the machinery joint between the rotating chuck 40 and the stationary cutting fluid gland 70. The bearing material is self-lubricating to reduce the amount of friction between the cutting fluid gland 70 and the chuck 40 and to prevent seizing during the cutting operation.

In a preferred embodiment, the bearing material is DU® bearing material available from Garlock Bearings Inc. The DU® bearing material comprises a steel backing which provides a high load carrying capability. A porous bronze innerstructure is sintered onto the steel backing. A polytetrafluoroethylene (PTFE) lead overlay is applied to the bronze innerstructure to provide an initial transfer film comprising an oxide type lubricant which coats the bearing surfaces 78 on the inner surface 76 of the cutting fluid gland 70. As the transfer film is depleted due to wear, additional lubricant is drawn to the bearing surfaces 78. Relative motion between the bearing surfaces 78 of the cutting fluid gland.70 and the bearing surfaces 62 on the medial portion 50 of chuck 40 distributes lubricant around the periphery of the bearing surfaces to maintain the low friction relationship between the cutting fluid gland 70 and the chuck 40.

The cutting fluid gland 70 comprises a rigid cutting fluid tube 77 extending outward from opening 72 for delivering the cutting fluid CF from the external source to the cutting portion 28 and the workpiece 14. Cutting fluid tube 77 comprises a rib for securing the flexible supply tube 14 to the cutting fluid tube so that the cutting fluid CF can be supplied to the cutting fluid gland 70 at an increased pressure without leakage. The opening 72 defines a fluid passageway 73 (FIG. 5) which is in fluid communication with reduced diameter portion 56 of medial portion 50. Accordingly, opening 72, reduced diameter portion 56, opening 52, increased diameter portion 54, rear flat 37, cavity 41 and bore 32 of oil hole drill 30 define a continuous fluid passageway for delivering the cutting fluid CF to the cutting portion 28 and the workpiece 18.

As is now apparent, the cutting body 20 delivers cutting fluid CF under pressure from an external source to the cutting portion 28 of a cutter and a workpiece 18 through a continuous fluid passageway. The continuous fluid passageway is defined by the angled opening 72 of the cutting fluid gland 70, the circumferential reduced diameter portion 56 on the outer surface 46 of the medial portion 50 of chuck 40, the radial opening 52 of the medial portion 50 of chuck 40, the circumferential increased diameter portion 54 on the inner surface 48 of the bore 42 of chuck 40, rear flat 37 on shank 36 of oil hole drill 30, cavity 41 in bore 42 of chuck 40 adjacent rear end 21 of the cutter body 20, and bore 32 of oil hole drill 30. The cutting fluid CF lubricates and cools the cutting portion 28 of the cutter and the workpiece 18, provides an improved finish on the workpiece, flushes composite dust and metal chips created during the cutting operation from the worksite, and prevents corrosion of the workpiece and the cutter.

In the drawings and the specification, there has been set forth a particular embodiment of the cutter body 20 according to the invention. Although specific terms are employed, they are used in a generic and descriptive sense only and not for purposes of limitation. Accordingly, there are many other embodiments of the invention which have not been described which nevertheless are intended to be included within the broad scope of the invention.

That which is claimed is:

1. A machining tool comprising:

a cutter comprising an elongate, generally cylindrical shank having a first end adjacent a cutting portion and a second end opposite the first end, wherein said shank has a longitudinal bore therethrough defining a fluid passageway for delivering a cutting fluid from an external source to a cutting portion of the cutter and a workpiece;

a cylindrical land disposed medially between the first end and the second end;

a forward flat extending from said land forward to the first end; and a rear flat extending from said land rearward to the second end; and a cutter body comprising a generally cylindrical chuck having opposed ends, a medial portion, and a longitudinal bore at least partially therethrough for receiving the cutter in gripping relation therein, the bore of said chuck defining a fluid passageway such that the bore of said chuck is in fluid communication with the bore of the cutter, the medial portion of said chuck having a first opening therein defining a fluid passageway such that the first opening is in fluid communication with the bore of said chuck; and an annular cutting fluid gland surrounding the medial portion of said chuck such that said chuck is rotatable relative to said gland, said gland having a second opening therein defining a fluid passageway such that the second opening is in fluid communication with the first opening of the medial portion of said chuck;

the second opening of said gland, the first opening of the medial portion of said chuck, the bore of said chuck and the bore of the cutter defining a continuous fluid passageway for delivering the cutting fluid from the external source to the cutting portion of the cutter and the workpiece.

2. A machining tool according to claim 1 wherein the medial portion of said chuck comprises longitudinally spaced-apart, circumferential lands defining bearing surfaces for engaging said gland; and a reduced diameter portion between said lands defining a circumferential fluid passageway such that the second opening is in fluid communication with the reduced diameter portion and the reduced diameter portion is in fluid communication with the first opening.

3. A machining tool according to claim 1 wherein said chuck comprises an increased diameter portion adjacent a first end of the medial portion; and said chuck has a circumferential groove therein adjacent a second end of the medial portion opposite the first end; and wherein said cutter body further comprises retaining means received in the groove of said chuck for securing said gland longitudinally between the increased diameter portion and the groove of said chuck.

4. A machining tool according to claim 3 wherein said retaining means is a snap ring.

5. A machining tool according to claim 1 wherein said chuck comprises an externally threaded end portion adjacent one opposed end for threadably engaging a rotatable spindle of a drilling machine; and wrenching flats adjacent the other opposed end for tightening said chuck onto the spindle of the drilling machine.

6. A machining tool according to claim 5 wherein said chuck comprises a locating pocket adjacent the other opposed end for positioning a countersink blade behind the cutting portion of the cutter.

7. A machining tool according to claim 6 wherein the drilling machine comprises a hydraulic depth sensor such that the cutting portion of the cutter machines a fastener hole to a predetermined depth and the countersink blade machines a countersink to a predetermined depth and diameter.

8. A cutter body according to claim 1 wherein the cutter is an oil hole drill.

9. A machining tool according to claim 1 wherein said cylindrical land forms a seal between said shank of the cutter and said chuck; and wherein said rear flat defines a fluid passageway such that the first opening of said chuck is in fluid communication with said rear flat and said rear flat is in fluid communication with the bore of said chuck.

10. A machining tool according to claim 1 wherein the cutting portion comprises a helical flute for flushing debris from the workpiece and said forward flat extends to said flute in a flute-to-flat transition for permitting the debris from the workpiece to exit along said machining tool in the direction of the second end.

11. A machining tool according to claim 1 wherein the cutting portion of the cutter is selected from the group consisting of a drill bit, a countersink bit, a counterbore bit, a back counterbore bit and a reamer bit.

12. A machining tool comprising:

a cutter comprising an elongate, generally cylindrical shank having a first end adjacent a cutting portion and a second end opposite the first end, wherein said shank has a longitudinal bore therethrough defining a fluid passageway for delivering cutting fluid from an external source to a cutting portion of the cutter and a workpiece;

a cylindrical land disposed medially between the first end and the second end;

a forward flat extending from said land forward to the first end; and a rear flat extending from said land rearward to the second end; and a cutter body comprising an elongated generally cylindrical chuck adapted for gripping the cutter, said chuck having opposed ends, a medial portion positioned between the opposed ends, and a longitudinal bore at least partially therethrough for receiving the cutter in gripping relation therein, the medial portion of said chuck comprising a pair of longitudinally spaced-apart, circumferential bearing surfaces and a reduced diameter portion between the bearing surfaces, the reduced diameter portion of the medial portion having a first opening therein extending radially inward to the bore of said chuck, the reduced diameter portion in fluid communication with the first opening, the first opening in fluid communication with the bore of said chuck, and the bore of said chuck in fluid communication with the bore of the cutter;

gripping means for gripping the cutter within the bore of said chuck such that the cutter extends outward from an opposed end of said chuck; and an annular cutting fluid gland surrounding and engaging the bearing surfaces of the medial portion of said chuck such that said chuck is rotatable relative to said gland, said gland having a second opening therethrough defining a fluid passageway, the second opening in fluid communication with the reduced diameter portion of the medial portion of said chuck;

the second opening, the reduced diameter portion, the first opening, the bore of said chuck and the bore of the cutter defining a continuous fluid passageway for delivering the cutting fluid from the external source to the cutting portion of the cutter and the workpiece.

13. A machining tool according to claim 12 wherein the medial portion of said chuck further comprises an increased diameter portion adjacent the bore of said chuck defining a fluid passageway such that the first opening is in fluid communication with the increased diameter portion and the increased diameter portion is in fluid communication with the bore of said chuck;

the second opening, the reduced diameter portion, the first opening, the increased diameter portion of the medial portion of said chuck, the bore of said chuck and the bore of the cutter defining a continuous fluid passageway for delivering the cutting fluid from the external source to the cutting portion of the cutter and the workpiece.

14. A machining tool according to claim 12 wherein said chuck further comprises an increased diameter portion adjacent a first end of the medial portion defining a shoulder with a bearing surface of the medial portion; and said chuck has a circumferential groove therein adjacent a second end of the medial portion opposite the first end of the medial portion; and wherein said machining tool further comprises retaining means received in the groove for securing said gland longitudinally between the shoulder and the groove of said chuck.

15. A machining tool according to claim 14 wherein said retaining means is a snap ring.

16. A cutter body according to claim 12 wherein the cutter is an oil hole drill.

17. A machining tool according to claim 12 wherein said gripping means comprises at least one internally threaded hole extending radially inward from the reduced diameter portion of the medial portion of said chuck to the bore of said chuck; and at least one externally threaded set screw threadably engaging said threaded hole and tightened against said rear flat on said shank to secure the cutter in gripping relation within the bore of said chuck.

18. A machining tool according to claim 12 wherein at least a portion of the inner surface of said gland comprises a self-lubricating, self-sealing bearing material for engaging the bearing surfaces of the medial portion of said chuck.

19. A machining tool according to claim 18 wherein said self-lubricating, self-sealing bearing material comprises a steel backing, a porous bronze innerstructure sintered onto said steel backing, and a polytetrafluoroethylene (PTFE) lead overlay applied to said bronze innerstructure to provide an initial transfer film comprising an oxide lubricant which coats the bearing surfaces of the medial portion of said chuck.

20. A machining tool according to claim 12 wherein the second opening extends inward from the outer surface of said gland in the direction of the cutting portion of the cutter.

21. A machining tool according to claim 20 wherein the second opening is cylindrical and the axis of the second opening defines an acute angle with the axis of the bore of the cutter.

22. A machining tool comprising:

a generally cylindrical cutter comprising a
   an elongate, generally cylindrical shank having opposed first and second ends and having a longitudinal bore therethrough which defines a fluid passageway;
   a cutting portion adjacent the first end of said shank;
   a cylindrical land disposed medially between the first and second ends of said shank;
   a forward flat extending from said land forward to the first end of said shank; and
   a rear flat extending from said land rearward to the second end of said shank;

a generally cylindrical chuck, said chuck having opposed ends, a medial portion disposed between the opposed ends, and a longitudinal bore at least partially therethrough for receiving said cutter and defining a fluid passageway, the medial portion having a radially extending first opening therethrough defining a fluid passageway, the first opening in fluid communication with the bore of said chuck and the bore of said chuck in fluid communication with the bore of said cutter;

gripping means for gripping said cutter within the bore of said chuck such that the cutting portion of said cutter extends outward beyond an opposed end of said chuck; and an annular cutting fluid gland surrounding the medial portion of said chuck such that said chuck is rotatable relative to said gland, said gland having a radially extending second opening defining a fluid passageway, the second opening in fluid communication with the first opening;

the second opening, the first opening, the bore of said chuck, and the bore of said cutter defining a continuous fluid passageway for delivering a cutting fluid from an external source to the cutting portion of said cutter and a workpiece.

23. A machining tool according to claim 22 wherein the medial portion of said chuck further comprises a reduced diameter portion defining a fluid passageway such that the second opening is in fluid communication with the reduced diameter portion and the reduced diameter portion is in fluid communication with the first opening;

an increased diameter portion adjacent the bore of said chuck defining a fluid passageway such that the first opening is in fluid communication with the increased diameter portion and the increased diameter portion is in fluid communication with the bore of said chuck;

the second opening, the reduced diameter portion, the first opening, the increased diameter portion, the bore of said chuck and the bore of said cutter defining a continuous fluid passageway for delivering the cutting fluid from an external source to the cutting portion of said cutter and the workpiece.

\* \* \* \* \*